(12) United States Patent
Spencer, V et al.

(10) Patent No.: US 8,798,814 B1
(45) Date of Patent: Aug. 5, 2014

(54) VERTICAL SITUATION AWARENESS FOR ROTORCRAFT

(75) Inventors: William Foulke Spencer, V, Dana Point, CA (US); Dan M. Wells, Tehachapi, CA (US)

(73) Assignee: The Boeing Company, Chicago, IL (US)

( * ) Notice: Subject to any disclaimer, the term of this patent is extended or adjusted under 35 U.S.C. 154(b) by 521 days.

(21) Appl. No.: 13/015,215

(22) Filed: Jan. 27, 2011

(51) Int. Cl.
*B64C 15/00* (2006.01)
*B64C 27/04* (2006.01)

(52) U.S. Cl.
CPC ......... *B64C 27/04* (2013.01); *B64C 2700/6201* (2013.01); *B64C 2700/6276* (2013.01)
USPC ............. 701/4; 701/3; 701/5; 701/6; 701/7; 701/8; 244/6; 244/7 A; 244/10; 244/17.13

(58) Field of Classification Search
CPC ........ B64C 15/00; B64C 27/00; B64C 27/02; B64C 27/04; B64C 27/06; B64C 27/08; B64C 27/12; B64C 27/20; B64C 27/22; B64C 29/00; B64C 29/0008; B64C 29/02; B64C 2700/6201; B64C 2700/6276; G09B 9/08
USPC ................ 701/3–8; 244/6, 7 A, 8, 10, 17.11, 244/17.21, 17.23, 17.25, 17.27, 21, 26, 39, 244/76 B, 79, 165, 177, 180, 182; 416/1, 18, 416/44, 134 A
See application file for complete search history.

(56) References Cited

U.S. PATENT DOCUMENTS

| | | | |
|---|---|---|---|
| 3,666,929 A | 5/1972 | Menn | |
| 4,224,669 A | 9/1980 | Brame | |
| 4,319,219 A | 3/1982 | Rein-Weston | |
| 4,758,839 A | 7/1988 | Goebel et al. | |
| 4,792,906 A | 12/1988 | King et al. | |
| 5,616,031 A * | 4/1997 | Logg | 434/38 |
| 5,936,552 A | 8/1999 | Wichgers et al. | |
| 5,945,926 A | 8/1999 | Ammar et al. | |
| 6,085,129 A | 7/2000 | Schardt et al. | |
| 6,282,466 B1 | 8/2001 | Nolte et al. | |
| 6,469,640 B2 | 10/2002 | Wyatt | |
| 6,690,298 B1 | 2/2004 | Barber et al. | |
| 6,690,299 B1 | 2/2004 | Suiter | |
| 6,708,091 B2 | 3/2004 | Tsao | |
| 6,720,891 B2 | 4/2004 | Chen et al. | |

(Continued)

FOREIGN PATENT DOCUMENTS

EP 2360453 A1 8/2011

OTHER PUBLICATIONS

U.S. Appl. No. 12/761,184, filed Apr. 15, 2010, Spencer, V.
U.S. Appl. No. 12/703,944, filed Feb. 11, 2010, Sharkany.

(Continued)

*Primary Examiner* — Mary Cheung
*Assistant Examiner* — Atul Trivedi
(74) *Attorney, Agent, or Firm* — Yee & Associates, P.C.

(57) ABSTRACT

A method and apparatus for managing a flight of a rotorcraft. Parameters for the flight of the rotorcraft are identified. A number of regions, above a terrain, to be avoided by the rotorcraft during the flight of the rotorcraft over the terrain are identified using the parameters for the flight of the rotorcraft. Information about the number of regions is displayed on a display device during the flight of the rotorcraft.

25 Claims, 10 Drawing Sheets

(56) References Cited

U.S. PATENT DOCUMENTS

| | | | |
|---|---|---|---|
| 6,798,423 B2 | 9/2004 | Wilkins, Jr. et al. | |
| 6,833,797 B2* | 12/2004 | Ishihara | 340/946 |
| 6,879,886 B2 | 4/2005 | Wilkins, Jr. et al. | |
| 6,995,690 B1 | 2/2006 | Chen et al. | |
| 6,999,023 B2 | 2/2006 | Block | |
| 7,010,398 B2 | 3/2006 | Wilkins, Jr. et al. | |
| 7,188,007 B2 | 3/2007 | Boorman et al. | |
| 7,219,011 B1 | 5/2007 | Barber | |
| 7,346,437 B2 | 3/2008 | Petillon | |
| 7,433,781 B2 | 10/2008 | Bitar et al. | |
| 7,437,245 B2* | 10/2008 | Ybarra et al. | 701/301 |
| 7,477,164 B1 | 1/2009 | Barber | |
| 7,634,335 B2 | 12/2009 | Bitar et al. | |
| 7,675,461 B1 | 3/2010 | McCusker et al. | |
| 7,714,744 B1* | 5/2010 | Wichgers | 340/965 |
| 7,962,254 B2 | 6/2011 | Bouchet et al. | |
| 7,976,310 B2* | 7/2011 | Bachelder et al. | 434/33 |
| 8,145,365 B2 | 3/2012 | Flotte et al. | |
| 8,170,728 B2* | 5/2012 | Roesch | 701/3 |
| 8,374,776 B2 | 2/2013 | Spencer, V | |
| 8,514,105 B1 | 8/2013 | Spencer, V et al. | |
| 2002/0022909 A1* | 2/2002 | Karem | 701/3 |
| 2002/0036574 A1* | 3/2002 | Ishihara | 340/945 |
| 2003/0006928 A1 | 1/2003 | Szeto et al. | |
| 2003/0184450 A1 | 10/2003 | Muller et al. | |
| 2003/0193410 A1 | 10/2003 | Chen et al. | |
| 2005/0051667 A1* | 3/2005 | Arlton et al. | 244/17.11 |
| 2006/0005147 A1 | 1/2006 | Hammack et al. | |
| 2006/0161336 A1 | 7/2006 | Wischmeyer | |
| 2006/0250280 A1 | 11/2006 | Chen et al. | |
| 2007/0055418 A1 | 3/2007 | Pire et al. | |
| 2007/0164167 A1* | 7/2007 | Bachelder et al. | 244/220 |
| 2007/0219705 A1 | 9/2007 | Bitar et al. | |
| 2008/0004801 A1 | 1/2008 | Bitar et al. | |
| 2008/0103643 A1 | 5/2008 | Artini | |
| 2008/0294305 A1* | 11/2008 | Roesch | 701/3 |
| 2008/0312781 A1 | 12/2008 | Nikolic et al. | |
| 2009/0212157 A1* | 8/2009 | Arlton et al. | 244/63 |
| 2009/0218439 A1* | 9/2009 | Carlson | 244/17.11 |
| 2009/0267800 A1 | 10/2009 | Hammack et al. | |
| 2010/0030401 A1 | 2/2010 | Rogers et al. | |
| 2010/0161155 A1* | 6/2010 | Simeray | 701/3 |
| 2010/0265268 A1 | 10/2010 | Wilson et al. | |
| 2010/0312421 A1* | 12/2010 | Eglin | 701/14 |

OTHER PUBLICATIONS

U.S. Appl. No. 12/751,144, filed Mar. 31, 2010, Spencer, V.
Spencer, V, "Display of Climb Capability for an Aircraft Based on Potential States for the Aircraft," U.S. Appl. No. 13/217,773, filed Aug. 25, 2011, 85 pages.
Notice of Allowance, dated Jan. 2, 2013, regarding U.S. Appl. No. 12/761,184, 7 pages.
European Search Report, dated May 25, 2011, regarding Application No. EP11153457.4, 6 pages.
"Height-velocity diagram", Wikipedia, pp. 1-2, retrieved Aug. 30, 2010 http://en.wikipedia.org/wiki/Height-velocity_diagram.
"File:Hvcurve.png", Wikipedia, pp. 1-3, retrieved Sep. 7, 2010 http://en.wikipedia.org/wikiFile:Hvcurve.png.
"T2CAS Product Description", Aviation Communication & Surveillance Systems, May 2003, pp. 1-15 www.L-3com.com/acss.
Office Action, dated Aug. 15, 2013, regarding U.S. Appl. No. 12/703,944, 23 pages.
Notice of Allowance, dated Sep. 17, 2013, regarding U.S. Appl. No. 13/217,773, 9 pages.
Office Action, dated Jan. 17, 2014, regarding U.S. Appl. No. 12/703,944, 23 pages.

* cited by examiner

VERTICAL SITUATION AWARENESS FOR ROTORCRAFT

BACKGROUND INFORMATION

1. Field

The present disclosure relates generally to aircraft and, in particular, to rotorcraft. Still more particularly, the present disclosure relates to displaying vertical situation awareness information for rotorcraft.

2. Background

A rotorcraft, also referred to as a rotary wing aircraft, is a type of aircraft that uses lift generated by revolving rotor blades to fly. These types of aircraft are used for performing many different operations. For example, different types of rotorcraft include, without limitation, police helicopters, logging helicopters, medical helicopters, firefighting helicopters, military helicopters, cargo-carrying helicopters, tilt-rotor aircraft, autogyros, rotary wing unmanned aerial vehicles, and/or other types of rotorcraft.

During flight, an undesired event may occur. The undesired event may be, for example, without limitation, a loss of an engine, a loss of multiple engines, a loss of tail rotor effectiveness, and/or some other suitable type of undesired event. In response to an undesired event occurring during flight, an operator of the rotorcraft may initiate maneuvers to make a safe landing on the ground. For example, autorotation may be used to safely land the rotorcraft.

However, in some cases, depending on the current combination of altitude and airspeed of the rotorcraft, autorotation of the rotorcraft to a safe landing may not be possible. Further, a number of parameters at a particular time during the flight, such as gross weight of the rotorcraft, density altitude of the rotorcraft, and/or other factors may affect the combinations of altitude and airspeed at which the rotorcraft is able to use autorotation to safely land on the ground without undesired effects to the rotorcraft and/or occupants of the rotorcraft.

Currently, operators of rotorcraft are required to learn how to use height-velocity diagrams to identify the combinations of altitude and airspeed to avoid during flight. These combinations of altitude and airspeed form regions that may be identified using, for example, height-velocity diagrams. Height-velocity diagrams are graphs presenting altitude above ground versus calibrated airspeed. The altitude above ground may be, for example, the altitude of the lowest point on a wheel of the rotorcraft above the ground.

Height-velocity diagrams may be used to identify the combinations of altitude and airspeed to avoid during flight. By avoiding these combinations of altitude and airspeed, the rotorcraft can use autorotation to descend to a safe landing in response to an undesired event occurring during the flight.

These height-velocity diagrams are graphs that are illustrated on physical pieces of paper in books, manuals, and/or binders. Looking up the correct height-velocity diagram for a particular type of rotorcraft, a particular set of parameters for a flight for the rotorcraft, and identifying the combinations of altitude and airspeed to be avoided during the flight may take more time and/or effort than desired.

Therefore, it would be advantageous to have a method and apparatus that takes into account one or more of the issues discussed above, as well as other possible issues.

SUMMARY

In one advantageous embodiment, a method is provided for managing a flight of a rotorcraft. Parameters for the flight of the rotorcraft are identified. A number of regions, above a terrain, to be avoided by the rotorcraft during the flight of the rotorcraft over the terrain is identified using the parameters for the flight of the rotorcraft. Information about the number of regions is displayed on a display device during the flight of the rotorcraft.

In another advantageous embodiment, an apparatus comprises a display device and a processor unit. The processor unit is configured to identify parameters for a flight of a rotorcraft. The processor unit is configured to identify a number of regions, above a terrain, to be avoided by the rotorcraft during the flight of the rotorcraft over the terrain using the parameters for the flight of the rotorcraft. The processor unit is configured to display information about the number of regions on the display device during the flight of the rotorcraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that currently, an operator of a rotorcraft determines the combinations of altitude and airspeed to avoid during flight using height-velocity diagrams illustrated in books and/or manuals. This process may take more time and/or effort than desired.

Further, the different advantageous embodiments recognize and take into account that as parameters of a flight for the rotorcraft change during the flight, the combinations of altitude and airspeed to be avoided may also change. Identifying the new combinations of altitude and airspeed to be avoided may take more time and/or effort than desired. For example, when the operator has to look up a height-velocity diagram in a manual to identify new combinations of altitude and airspeed to avoid, the operator may not be able to make the identification as quickly as desired.

Additionally, the different advantageous embodiments recognize and take into account that an identification of the combinations of altitude and airspeed to avoid using a height-velocity diagram illustrated on paper may not have a desired accuracy. Furthermore, the height-velocity diagrams published by many rotorcraft manufacturers may not include diagrams for all possible parameters. For example, without limitation, diagrams that take into account as many different values for gross weights and/or density altitude as desired may not be provided.

Thus, the different advantageous embodiments provide a method and apparatus for managing a flight for a rotorcraft. In one advantageous embodiment, parameters for the flight of the rotorcraft are identified. A number of regions, above a terrain, to be avoided by the rotorcraft during the flight of the rotorcraft over the terrain is identified using the parameters for the flight of the rotorcraft. Information about the number of regions is displayed on a display device during the flight for the rotorcraft.

Figure 1:
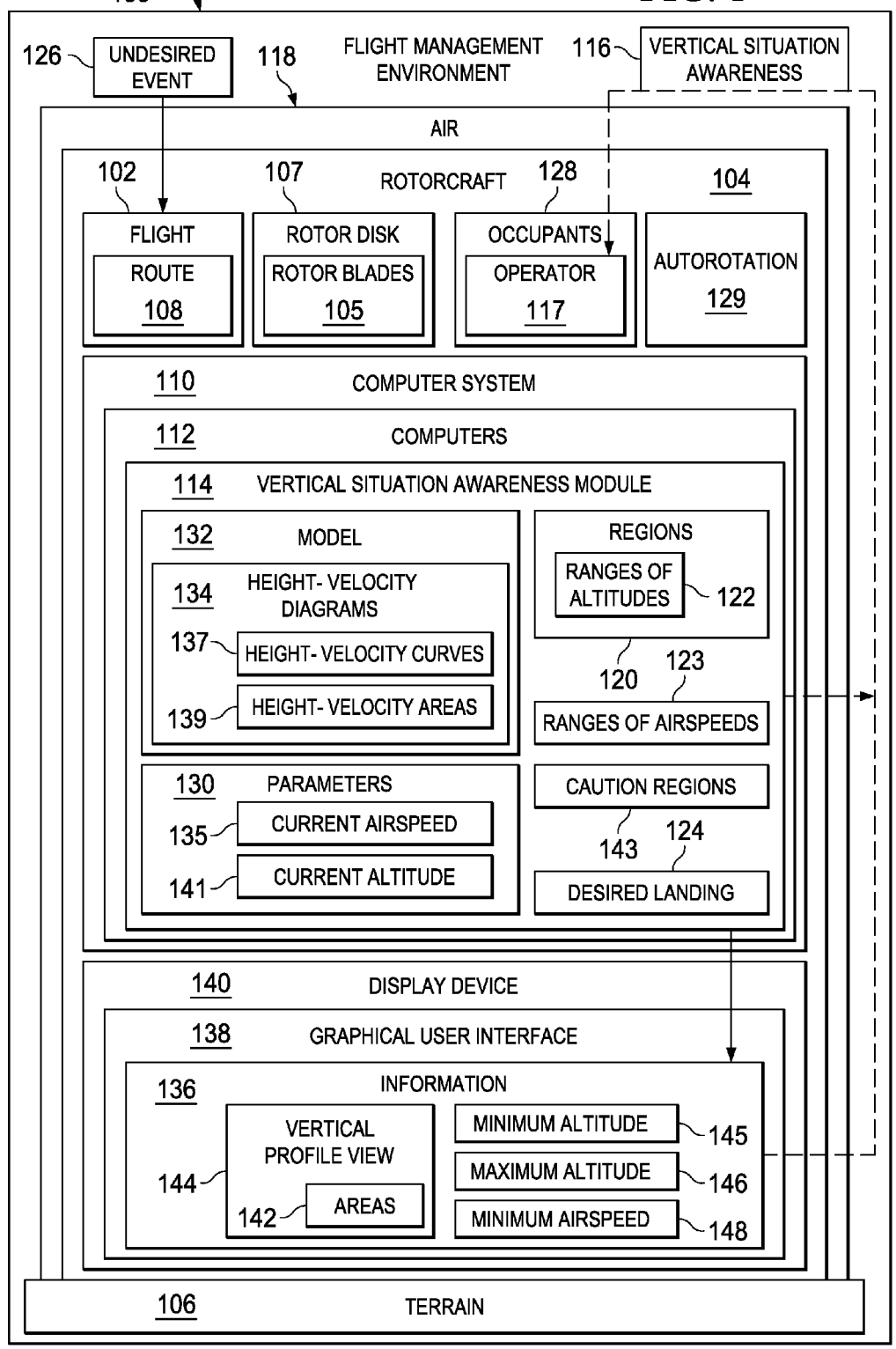
FIG. 1 is an illustration of a flight management environment in accordance with an advantageous embodiment.

With reference now to FIG. 1, an illustration of a flight management environment is depicted in accordance with an advantageous embodiment. A flight management environment 100 is an example of an environment in which a flight 102 of a rotorcraft 104 may be managed.

The rotorcraft's 104 flight 102 is over the terrain 106, including upcoming terrain, along a route 108. Upcoming terrain is the terrain 106 that will be passed over by the rotorcraft 104 during the flight 102. Additionally, the rotorcraft 104 may fly and/or hover over the terrain 106 during the flight 102. The terrain 106 over which the rotorcraft 104 flies may include at least one of the ground, land, water, building, and/or other types of surfaces.

In one embodiment, the rotorcraft 104 is an aircraft that uses rotor blades 105 revolving around a mast connected to the aircraft to generate lift. A rotor disk 107 is a disk-shaped region of airspace above the rotorcraft 104 in which the rotor blades 105 revolve. The rotorcraft 104 may take a number of different forms including, but not limited to, a helicopter, a tilt-rotor aircraft, an autogyro, a rotary wing unmanned aerial vehicle, a multi-engine rotorcraft, a single-engine rotorcraft, or some other suitable type of rotorcraft.

During the flight 102, the rotorcraft 104 may need to make a desired landing 124 on the terrain 106 in response to an undesired event 126. The undesired event 126 may be any event that occurs during the flight 102 that reduces the possibility of the rotorcraft 104 reaching a desired destination in a preferred manner. For example, the undesired event 126 may be a loss of an engine, an engine having compromised performance, a problem with a tail rotor, loss of tail rotor effectiveness, and/or some other type of undesirable event.

In contrast, the desired landing 124 is a landing on the terrain 106 in which undesirable effects do not occur to the rotorcraft 104 and/or occupants 128 in the rotorcraft 104 during the rotorcraft's 104 descent through the air 118 and onto the terrain 106. The occupants 128 may include at least one of a pilot, a co-pilot, a crew member, a passenger, and/or some other person in the rotorcraft 104 during the flight 102.

As used herein, the phrase "at least one of", when used with a list of items, means that different combinations of one or more of the listed items may be used and only one item in the list may be needed. For example, "at least one of item A, item B, and item C" may include, for example, without limitation, item A or item A and item B. This example also may include item A, item B, and item C or item B and item C.

In response to the undesired event 126, the rotorcraft 104 may make the desired landing 124 using autorotation 129. Autorotation 129 is a maneuver with which the rotorcraft 104 descends through the air 118 using the upward flow of the air 118 through the rotor disk 107 without using engine power or any other source of power.

After the undesired event 126 occurs, a change from normal flight to the autorotation 129 may take time. In normal flight, engine power sent to the rotor blades 105 pushes the air 118 down through the rotor disk 107. During the autorotation 129, the air 118 flowing up through the rotor disk 107, as the rotorcraft 104 descends, provides the power needed to keep the rotor blades 105 turning.

Changing from normal flight to the autorotation 129 may require a number of operations to be performed. A number of items, as used herein, means one or more items. For example, a number of operations are one or more operations.

These operations include, for example, changing the airspeed of the rotorcraft 104, keeping the rate at which the rotor blades 105 turn within a preferred range, initiating descent of the rotorcraft 104, and reversing the flow of the air 118 through the rotor disk 107. Performing these operations for the rotorcraft 104 to enter the autorotation 129 takes both time and energy. For example, the rotorcraft 104 uses at least one of its potential energy, based on the altitude of the aircraft, and/or kinetic energy, based on the airspeed of the aircraft, to enter the autorotation 129.

In one embodiment, successful autorotation 129 includes the rotorcraft 104 being in the autorotation 129 before reaching the terrain 106. When complete entry into the autorotation 129 is achieved by the rotorcraft 104 before reaching the terrain 106, the desired landing 124 may be made. However, when entry into the autorotation 129 is not completed before reaching the terrain 106, the desired landing 124 may not be possible. For example, undesirable effects may occur to the rotorcraft 104 and/or the occupants 128 in the rotorcraft 104.

The possibility of complete entry into the autorotation 129 before reaching the terrain 106 can be predicted using parameters 130 for the rotorcraft 104 at the current time. In particular, the parameters 130 for the rotorcraft 104 at the current time include the current airspeed 135 and the current altitude 141 of the rotorcraft 104. Additionally, other various parameters 130 may include, but are not limited to, airspeed, altitude, gross weight of the rotorcraft 104, density altitude, and/or other relevant types of parameters 130.

In one embodiment, the current airspeed 135 is a calibrated airspeed of the rotorcraft 104. Further, the current altitude 141 is the rotorcraft's 104 altitude above ground level, or the terrain 106. In one embodiment, the current altitude 141 of the rotorcraft 104 is measured as the height of the lowest point on the rotorcraft's 104 wheels or skids above the terrain 106. The combination of the current airspeed 135 and the current altitude 141 provides the usable energy available for the rotorcraft 104 to attempt entry into the autorotation 129.

The rotorcraft 104 can make the desired landing 124 on the terrain 106 using the autorotation 129 in response to the undesired event 126 occurring during the flight 102 by avoiding ranges of altitudes 122 when flying at a particular airspeed. Similarly, the rotorcraft 104 can make the desired landing 124 on the terrain 106 using the autorotation 129 in response to the undesired event 126 occurring during the flight 102 by avoiding ranges of airspeeds 123 when flying at a particular altitude.

In order to enter the autorotation 129 from a normal flight before reaching the terrain 106, the rotorcraft 104 must avoid flying within regions 120 of airspace. In these examples, the regions 120 are physical regions 120 of airspace through which the rotorcraft 104 may fly.

Each region of airspace to be avoided includes a particular range of altitudes to be avoided by the rotorcraft 104 at a particular airspeed. For example, for any given airspeed within the particular ranges of airspeeds 123, a region of airspace includes a range of altitudes to be avoided by the rotorcraft 104 during the rotorcraft's 104 flight 102. The regions 120 of airspace to be avoided by the rotorcraft 104 is determined based on the parameters 130 for the rotorcraft 104. The regions 120 of airspace to be avoided may also be referred to as avoid regions.

In one embodiment, the regions 120 of airspace to be avoided by the rotorcraft 104 may be identified by a vertical situation awareness module 114 running on a computer system 110 in the rotorcraft 104. The vertical situation awareness module 114 identifies the regions 120 of airspace to be avoided using the various parameters 130.

In this example, the vertical situation awareness module 114 may be a program running on the computer system 110. The vertical situation awareness module 114 may be implemented in different ways. For example, the vertical situation awareness module 114 may be in the form of software, hardware, or a combination of the two.

As depicted, the computer system 110 takes the form of computers 112 in these illustrative examples. In these depicted examples, the vertical situation awareness module 114 runs on one or more of computers 112. The vertical situation awareness module 114 identifies the regions 120 of airspace to be avoided using the various parameters 130.

The vertical situation awareness module 114 is configured to provide vertical situation awareness 116 to an operator 117 of the rotorcraft 104. The operator 117 may be, for example, the rotorcraft's 104 pilot. In these illustrative examples, the vertical situation awareness 116 is a perception and understanding of the environmental elements in a vertical direction with respect to the rotorcraft 104 and a projection of these environmental elements' status in the near future with respect to the rotorcraft 104. Further, the vertical situation awareness 116 may include an awareness of how information 136, events, and/or the operator's 117 own actions, along with the rotorcraft's 104 current and/or near-future altitude will affect the flight 102 of the rotorcraft 104.

The vertical situation awareness 116 provided to the operator 117 includes an awareness of the regions 120 of airspace above the terrain 106 that need to be avoided by the rotorcraft 104 during the flight 102. The operator 117 can use this vertical situation awareness 116 to properly and safely fly the rotorcraft 104 in a preferred manner.

In one embodiment, the vertical situation awareness module 114 identifies the regions 120 to be avoided using the various parameters 130 and a model 132. As illustrated, the model 132 is a set of data and identifies the energy available for the rotorcraft 104 to enter into the autorotation 129. The model 132 also identifies the conditions in which sufficient energy is not available for the rotorcraft 104 to fully enter the autorotation 129 before contacting the terrain 106 in response to the undesired event 126. In particular, the model 132 identifies these conditions based on the various parameters 130 and/or other relevant factors. A subset of the information 136 included in the model 132 is presented in the height-velocity diagrams 134.

In one embodiment, the height-velocity diagrams 134 may be obtained from, for example, books, manuals, and/or publications provided by the manufacturer of the rotorcraft 104 and other relevant sources. The height-velocity diagrams 134 are based on various altitudes and/or airspeeds, as well as other factors.

In one embodiment, the height-velocity diagrams 134 include graphs of height-velocity curves 137, which identify the boundaries and/or define height-velocity areas 139. In this embodiment, a height-velocity diagram 134 is a two-dimensional graph that has shaded areas, which may be referred to as the height-velocity areas 139. These shaded height-velocity areas 139 represent combinations of airspeed and altitude which, given certain parameters 130, may not provide sufficient energy to accomplish a transition to autorotation 129 prior to contact with the terrain 106. For example, operators 117 are cautioned, through height-velocity diagrams 134, to avoid operating rotorcraft 104 with any combination of a current airspeed 135 and a current altitude 141 that is included in a height-velocity area 139. Each height-velocity area 139 is bounded by a height-velocity curve 137. Further, one example of a height-velocity diagram in the height-velocity diagrams 134 may include a curve identifying a safe takeoff profile for the rotorcraft 104. In another embodiment, the height-velocity diagrams 134 may contain data presented in the form of a table or database instead of graphs.

In one embodiment, the vertical situation awareness module 114 displays the information 136 concerning the various regions 120 of airspace to be avoided on a display device 140 for the operator 117 to view. The display device 140 may include, but is not limited to, at least one of a monitor, a touchscreen, a seven-segment display device, or some other suitable type of display device 140.

The operator 117 of the rotorcraft 104 may interact with and/or control the displayed information 136 via a graphical user interface 138. In alternate embodiments, other types of navigation and control means, such as speech recognition or natural language processing, may also be used. The information 136 displayed to the operator 117 via the graphical user interface 138 may provide the operator 117 with vertical situation awareness 116. In other words, by viewing the information 136 displayed on the display device 140, the operator 117 can acquire the vertical situation awareness 116 needed to fly the rotorcraft 104 safely and make a desired landing 124 when needed.

As one illustrative example, the vertical situation awareness module 114 displays the areas 142 corresponding to the regions 120 of airspace to be avoided on a vertical profile view 144 displayed on the graphical user interface 138. The vertical profile view 144 is the vertical profile view 144 of the terrain 106 along the route 108 for the flight 102 of the rotorcraft 104.

In these illustrative examples, an area in the areas 142 may be a graphical representation of a region of airspace to be avoided by the rotorcraft 104. In this manner, the operator 117 of the rotorcraft 104 may view the regions 120 to be avoided during the flight 102 on the graphical user interface 138 on the display device 140.

In some illustrative examples, the areas 142 may include the areas 142 that are caution regions 143. The caution regions 143 may be identified by the vertical situation awareness module 114 as the regions 120 of airspace around the regions 120 of airspace to be avoided. These caution regions 143 include altitudes at which the operator 117 does not necessarily have to avoid when flying the rotorcraft 104 but should be more cautious if flying at these altitudes.

As one illustrative example, the caution regions 143 may be identified when the rotorcraft 104 has two engines. For example, the caution regions 143 may include the regions 120 of airspace from which the rotorcraft 104 may make the desired landing 124 on the terrain 106 when the undesired event 126 occurs for one engine. In other words, if the rotorcraft 104 loses one of the two engines, the caution regions 143 indicate the altitudes at which the rotorcraft 104 may fly and still be able to make the desired landing 124.

In another embodiment, the vertical situation awareness module 114 may display a minimum altitude 145 and a maximum altitude 146 on the display device 140. The minimum altitude 145 is the lowest altitude at which the rotorcraft 104 can fly and still be able to make the desired landing 124 in response to the undesired event 126. In other words, the minimum altitude 145 is the lowest altitude to which the rotorcraft 104 can descend without flying into the range of altitudes 122 to be avoided at the current airspeed 135.

In contrast, the maximum altitude 146 is the highest altitude at which the rotorcraft 104 can fly and still be able to make the desired landing 124 in response to the undesired event 126. In other words, the maximum altitude 146 is the highest altitude to which the rotorcraft 104 can ascend without flying into the range of altitudes 122 to be avoided at the current airspeed 135.

Additionally, the vertical situation awareness module 114 may also identify the minimum airspeed 148 using the various parameters 130 and the model 132 and display the minimum airspeed 148 on the display device 140. In other words, the minimum airspeed 148 is the slowest airspeed at which the rotorcraft 104 can fly without flying in the range of airspeeds 123 to be avoided at a specific altitude. The minimum airspeed 148 is the slowest airspeed at which the rotorcraft 104 can fly and still successfully enter autorotation 129 and make a desired landing 124 on the terrain 106 without causing undesirable effects to the rotorcraft 104 and/or its occupants 128. For example, autorotation 129 from the current altitude 141 or from a particular predicted altitude to a desired landing 124 on the terrain 106 may not be possible when the autorotation 129 begins at an airspeed below the minimum airspeed 148.

The illustration of the flight management environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one embodiment, one or more computers 112 in the computer system 110 may be located remote to the rotorcraft 104, such as at a ground station. As another example, the vertical situation awareness module 114 may identify the regions 120 to be avoided by the rotorcraft 104 prior to the actual flight 102 of the rotorcraft 104.

In yet another example, the vertical situation awareness module 114 may generate audio and/or visual alerts to indicate when the rotorcraft 104 is flying within the regions 120 to be avoided and/or the caution regions 143. For example, an audio alert, such as a computerized voice recording, may be played when the rotorcraft 104 is flying within the regions 120 and/or the caution regions 143 to indicate that the operator 117 may need to change the altitude of the rotorcraft 104.

Figure 2:
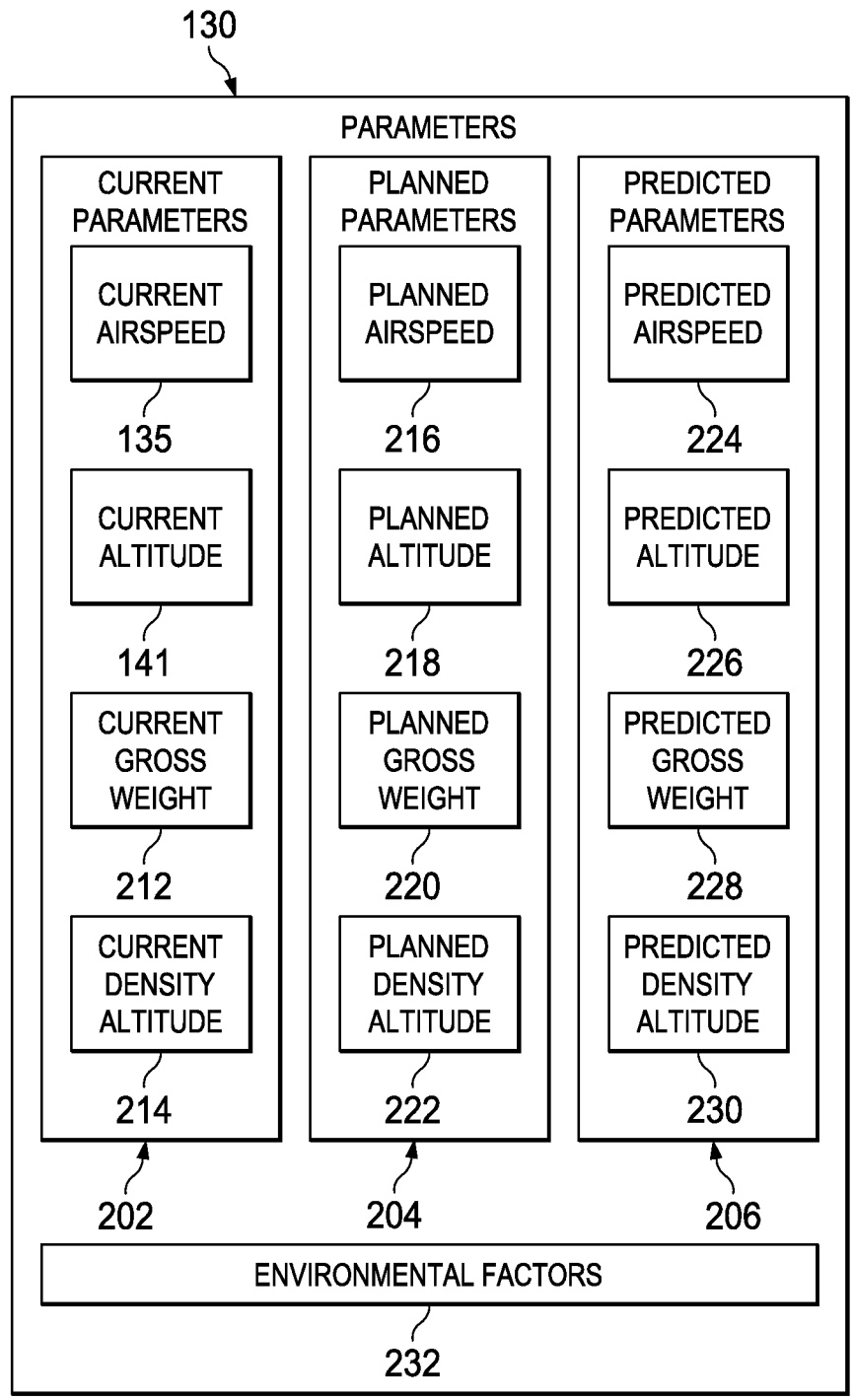
FIG. 2 is an illustration of parameters identified by a vertical situation awareness process in accordance with an advantageous embodiment.

FIG. 2 illustrates one embodiment of the parameters 130 identified and utilized by the vertical situation awareness module 114. These parameters 130 include, but are not limited to, current parameters 202, planned parameters 204, and/or predicted parameters 206.

Current parameters 202 are those which occur at a current point along the flight route of the rotorcraft 104. Current parameters 202 include, but are not limited to, current airspeed 135, current altitude 141, current gross weight 212, current density altitude 214, and/or other relevant parameters 130.

Current airspeed 135 is a calibrated airspeed, which is the speed shown by the rotorcraft's 104 airspeed indicator after correction for instrument error and position error. The current altitude 141 is an altitude above ground level, which is measured as the distance between the surface of the terrain 106 and a lowest point on the rotorcraft 104.

Current gross weight 212 is the gross weight of the rotorcraft 104. The gross weight of the rotorcraft 104 may change during the flight 102 due to a number of different factors. For example, the gross weight of the rotorcraft 104 may change based on fuel consumption during the flight 102, unloading of cargo during the flight 102, and/or other relevant factors. Current density altitude 214 is the measure of the density of the atmosphere surrounding the rotorcraft 104, with respect to an altitude above mean sea level in a defined, standard atmosphere, which has substantially the same atmospheric density as the atmosphere currently surrounding the rotorcraft 104.

As shown in FIG. 2, planned parameters 204 include the parameters 130 expected for the rotorcraft 104 as set by the flight plan. These planned parameters 204 include, but are not limited to, planned airspeed 216, planned altitude 218, planned gross weight 220, planned density altitude 222, and/or other relevant parameters 130.

Predicted parameters 206 include the parameters 130 that may be predicted for the rotorcraft 104 for different points along the route 108 during the flight 102. In other words, predicted parameters 206 may be computed during the flight 102 based on current parameters 202, planned parameters 204, and/or the upcoming terrain along the flight route. In one embodiment, predicted parameters 206 include, but are not limited to, predicted airspeed 224, predicted altitude 226, predicted gross weight 228, predicted density altitude 230, and/or other relevant parameters 130.

Additionally, parameters 130 may include other parameters 130, such as, for example, environmental factors 232 such as predicted weather conditions, and/or other relevant parameters 130.

Figure 3:
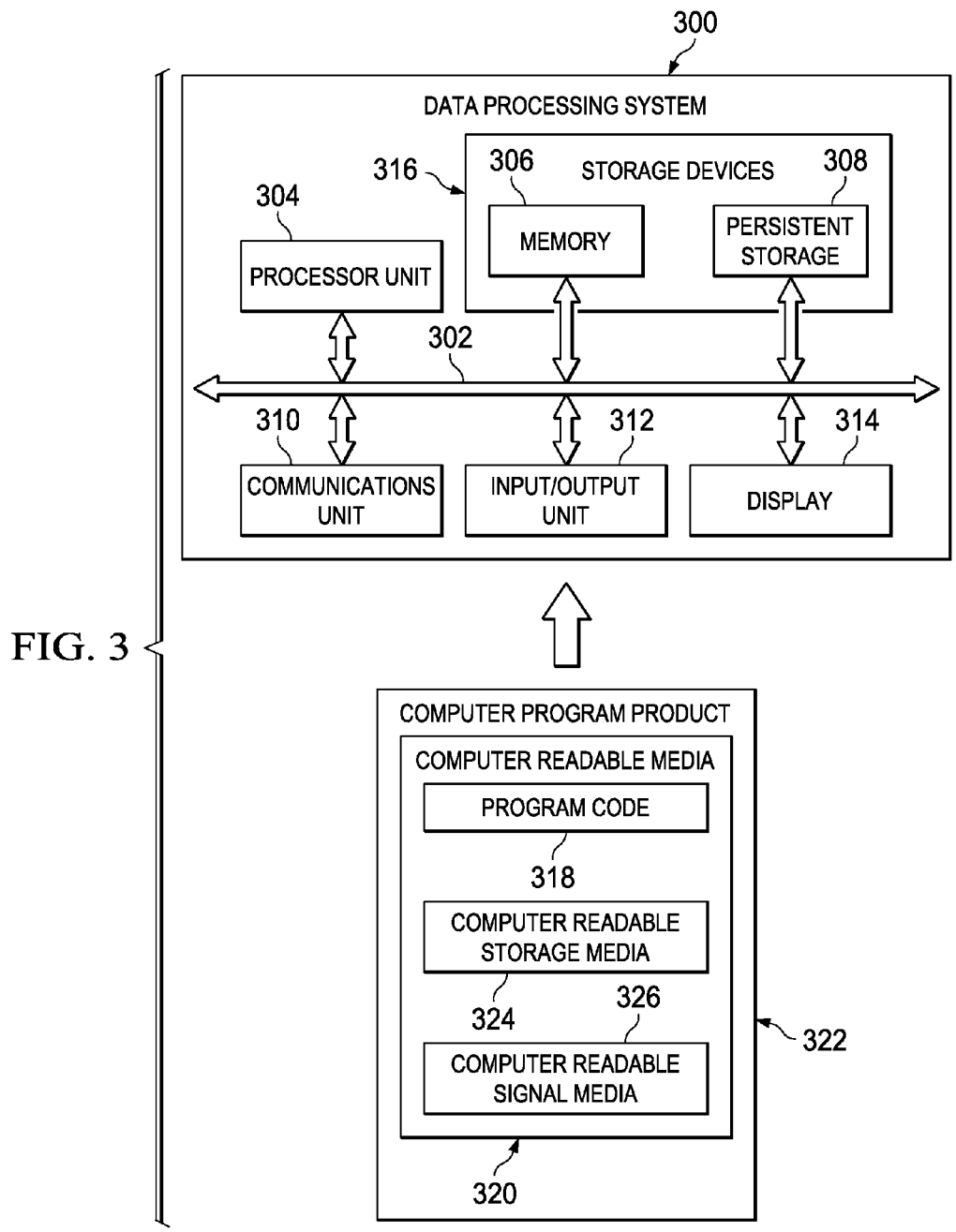
FIG. 3 is an illustration of a data processing system in accordance with an advantageous embodiment.

Turning now to FIG. 3, an illustration of a data processing system 300 is depicted in accordance with an advantageous embodiment. In this illustrative example, the data processing system 300 is an example of one implementation for a computer in the computers 112 in FIG. 1. As depicted, the data processing system 300 includes a communications fabric 302, which provides communications between a processor unit 304, memory 306, persistent storage 308, a communications unit 310, an input/output (I/O) unit 312, and a display 314.

Processor unit 304 serves to execute instructions for software that may be loaded into memory 306. The processor unit 304 may be a number of processors, a multi-processor core, or some other type of processor, depending on the particular implementation. A number, as used herein with reference to an item, means one or more items. Further, the processor unit 304 may be implemented using a number of heterogeneous processor systems in which a main processor is present with secondary processors on a single chip. As another illustrative example, the processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Storage devices 316 may also be referred to as computer readable storage devices in these examples. Memory 306, in these examples, may be, for example, a random access memory or any other suitable volatile or non-volatile storage device. Persistent storage 308 may take various forms, depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

The input/output unit 312 allows for input and output of data with other devices that may be connected to data processing system 300. For example, the input/output unit 312 may provide a connection for user input through a keyboard, a mouse, and/or some other suitable input device. Further, the input/output unit 312 may send output to a printer. The display 314 provides a mechanism to display information to a user.

Instructions for the operating system, applications, and/or programs may be located in storage devices 316, which are in communication with the processor unit 304 through the communications fabric 302. In these illustrative examples, the instructions are in a functional form on persistent storage 308. These instructions may be loaded into memory 306 for execution by the processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in the processor unit 304. The program code in the different embodiments may be embodied on different physical or computer readable storage media, such as memory 306 or persistent storage 308.

Program code 318 is located in a functional form on computer readable media 320 that is selectively removable and may be loaded onto or transferred to the data processing system 300 for execution by processor unit 304. Program code 318 and computer readable media 320 form a computer program product 322 in these examples. In one example, computer readable media 320 may be computer readable storage media 324 or computer readable signal media 326. Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory, that is connected to the data processing system 300. In some instances, computer readable storage media 324 may not be removable from the data processing system 300.

Alternatively, program code 318 may be transferred to the data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 318 may be downloaded over a network to persistent storage 308 from another device or data processing system through computer readable signal media 326 for use within the data processing system 300. For instance, program code stored in a computer readable storage medium in a server data processing system may be downloaded over a network from the server to the data processing system 300. The data processing system providing program code 318 may be a server computer, a client computer, or some other device capable of storing and transmitting program code 318.

The different components illustrated for the data processing system 300 are not meant to provide architectural limitations to the manner in which different embodiments may be implemented. The different advantageous embodiments may be implemented in a data processing system including components in addition to or in place of those illustrated for the data processing system 300. Other components shown in FIG. 3 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 304 may take the form of a hardware unit that has circuits that are manufactured or configured for a particular use. This type of hardware may perform operations without needing program code to be loaded into a memory from a storage device to be configured to perform the operations.

For example, when the processor unit 304 takes the form of a hardware unit, the processor unit 304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 318 may be omitted, because the processes for the different embodiments are implemented in a hardware unit.

In still another illustrative example, the processor unit 304 may be implemented using a combination of processors found in the computers 112 and hardware units. The processor unit 304 may have a number of hardware units and a number of processors that are configured to run program code 318. With this depicted example, some of the processes may be implemented in the number of hardware units, while other processes may be implemented in the number of processors.

As another example, a storage device in the data processing system 300 is any hardware apparatus that may store data. Memory 306, persistent storage 308, and computer readable media 320 are examples of storage devices in a tangible form.

In another example, a bus system may be used to implement the communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306, or a cache, such as found in an interface and memory controller hub that may be present in communications fabric 302.

Figure 4:
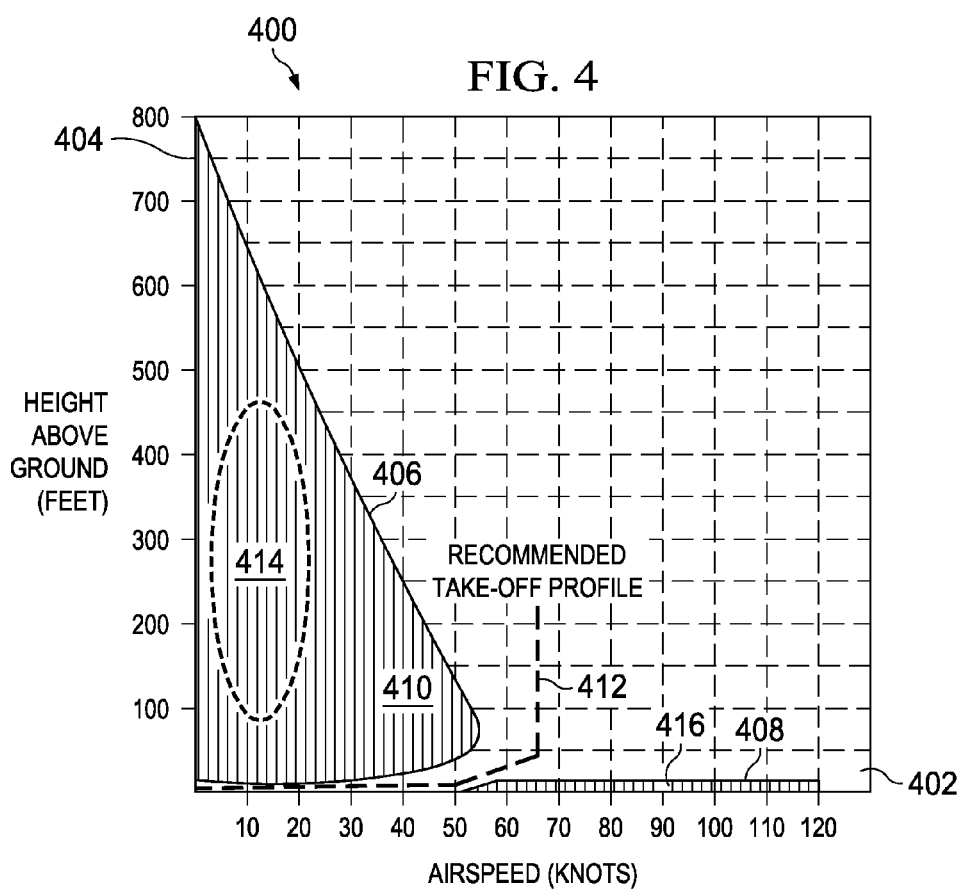
FIG. 4 is an illustration of a height-velocity diagram for a rotorcraft in accordance with an advantageous embodiment.

FIG. 4 illustrates a height velocity diagram 400 for the rotorcraft 104 in accordance with an advantageous embodiment. The height-velocity diagram 400 is an example of one of the height-velocity diagrams 134 in the model 132. The height-velocity diagram 400 includes a horizontal axis 402, which designates calibrated airspeed in knots, and a vertical axis 404, which designates altitude in feet.

The height-velocity diagram 400 also includes a first curve 406 and a second curve 408. The first curve 406 is a height-velocity curve for the rotorcraft 104 when it has a gross weight of about 8500 pounds or less. The first curve 406 defines the boundary of a first height-velocity area 410 that identifies a number of combinations of altitude and airspeed which must be avoided during the flight 102. The flight 102 at any of these combinations of altitude and airspeed may not provide the energy needed to enter the autorotation 129 and make the desired landing 124.

In one embodiment, when the rotorcraft 104 is flying at a particular airspeed, between about zero knots and about 54 knots, the first curve 406 defines a range of altitudes, such as a range of altitudes 122 in FIG. 1, at which the flight 102 must be avoided. For example, at an airspeed of about 40 knots, the flight 102 is to be avoided at altitudes between about 25 feet and about 250 feet above the terrain 106.

In this illustrative example, fewer undesirable effects may occur to the rotorcraft 104 and/or the occupants 128 when the rotorcraft 104 flies at combinations of altitude and airspeed within the first height-velocity area 410 and near the first curve 406, compared to when the rotorcraft 104 flies at combinations of altitude and airspeed within the center portion 414 of the first height-velocity area 410.

As illustrated, the second curve 408 defines the boundary of a second height-velocity area 416 that identifies a range of altitudes to be avoided when the rotorcraft 104 is flying at speeds between about 51 knots and about 120 knots. As depicted, at airspeeds above about 60 knots, the flight 102 is to be avoided at altitudes below about 14 feet above the terrain 106.

Additionally, a recommended takeoff profile 412 is depicted. The recommended takeoff profile 412 indicates the altitude recommended to be flown by the pilot until achieving sufficient airspeed to climb without entering first height-velocity area 410, and before reaching a speed matching second height-velocity area 416. Recommended takeoff profile 412 then recommends the height profile to be followed as the rotorcraft 104 climbs into the area not included in either first height-velocity area 410 or second height-velocity area 412.

Figure 5:
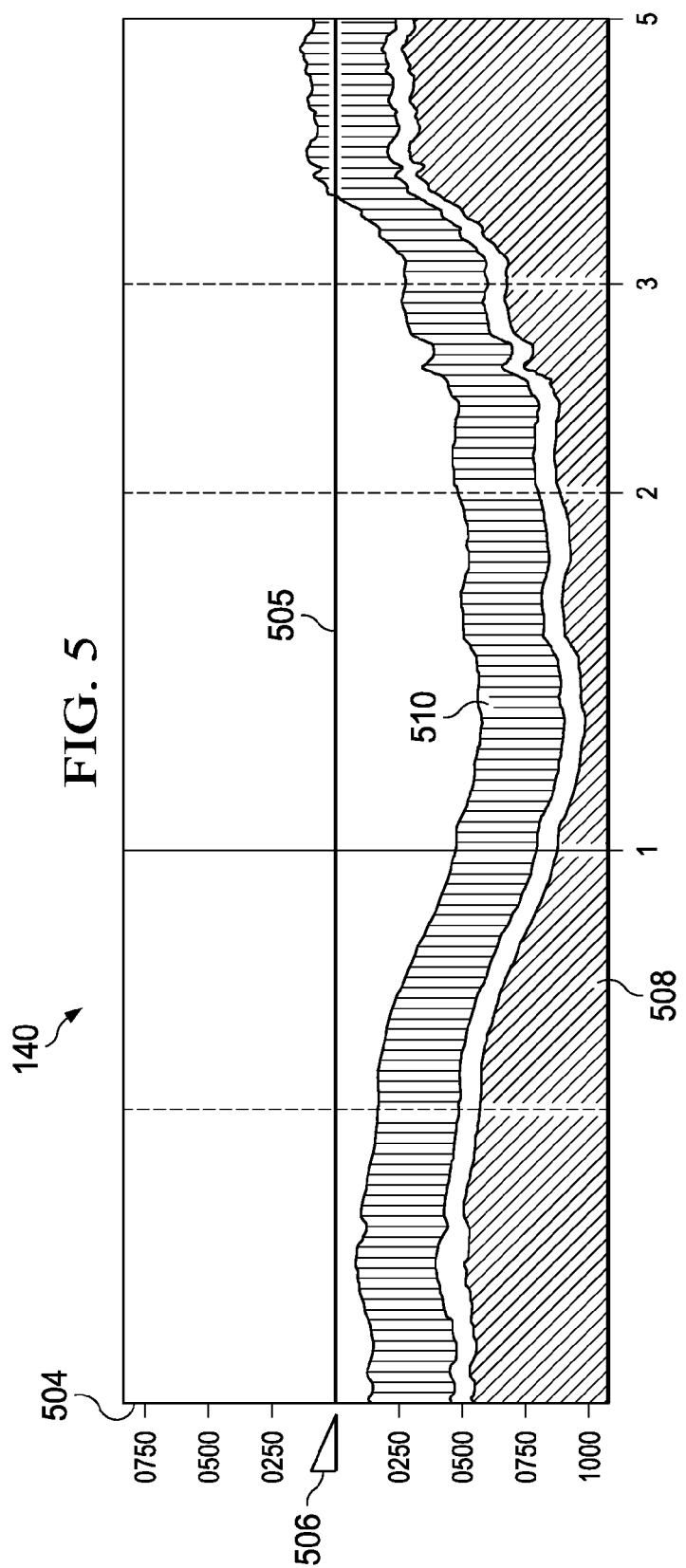
FIG. 5 is an illustration of a graphical user interface in accordance with an advantageous embodiment.

FIG. 5 illustrates one advantageous embodiment of a graphical image displayed on the display device 140. The image includes the vertical profile view 144 of a rotorcraft's 104 flight route. The vertical profile view 144 includes a vertical axis 504 that depicts the rotorcraft's 104 altitude in feet and a horizontal axis 505 that depicts the position of upcoming terrain relative to the rotorcraft 104 in nautical miles.

The vertical profile view 144 also includes a rotorcraft icon 506 that represents the rotorcraft 104. The rotorcraft icon 506 is positioned along the vertical axis 504 at a point that represents the current altitude 141 of the rotorcraft 104 during the flight 102 and its current position over the terrain 106. Additionally, a horizontal axis 505 is displayed on the display device 140 in an alignment with the rotorcraft icon 506.

Still referring to FIG. 5, the vertical profile view 144 also includes a terrain area 508 and an avoid area 510. The terrain area 508 shows a cross section of the upcoming terrain 106 in front of the rotorcraft 104, over which it will fly. As the rotorcraft 104 flies (to the right of the image of FIG. 5), the terrain area 508 scrolls leftwards under the rotorcraft 104. In another embodiment, heights relative to the rotorcraft 104 or to sea level can be shown on the vertical axis 504, and ranges (e.g. nautical miles) can be shown on the horizontal axis 505.

The avoid area 510 shows the range of altitudes above the terrain 106 to be avoided by the rotorcraft 104 during the flight 102 based on the rotorcraft's 104 current airspeed 135. In one embodiment, the avoid area 510 indicates a range of altitudes between about 50 feet and about 400 feet above the terrain 106 that remains substantially the same across the upcoming terrain 106 along the rotorcraft's 104 route 108. The display of the avoid area 510 provides the vertical situation awareness 116 to the pilot.

Figure 6:
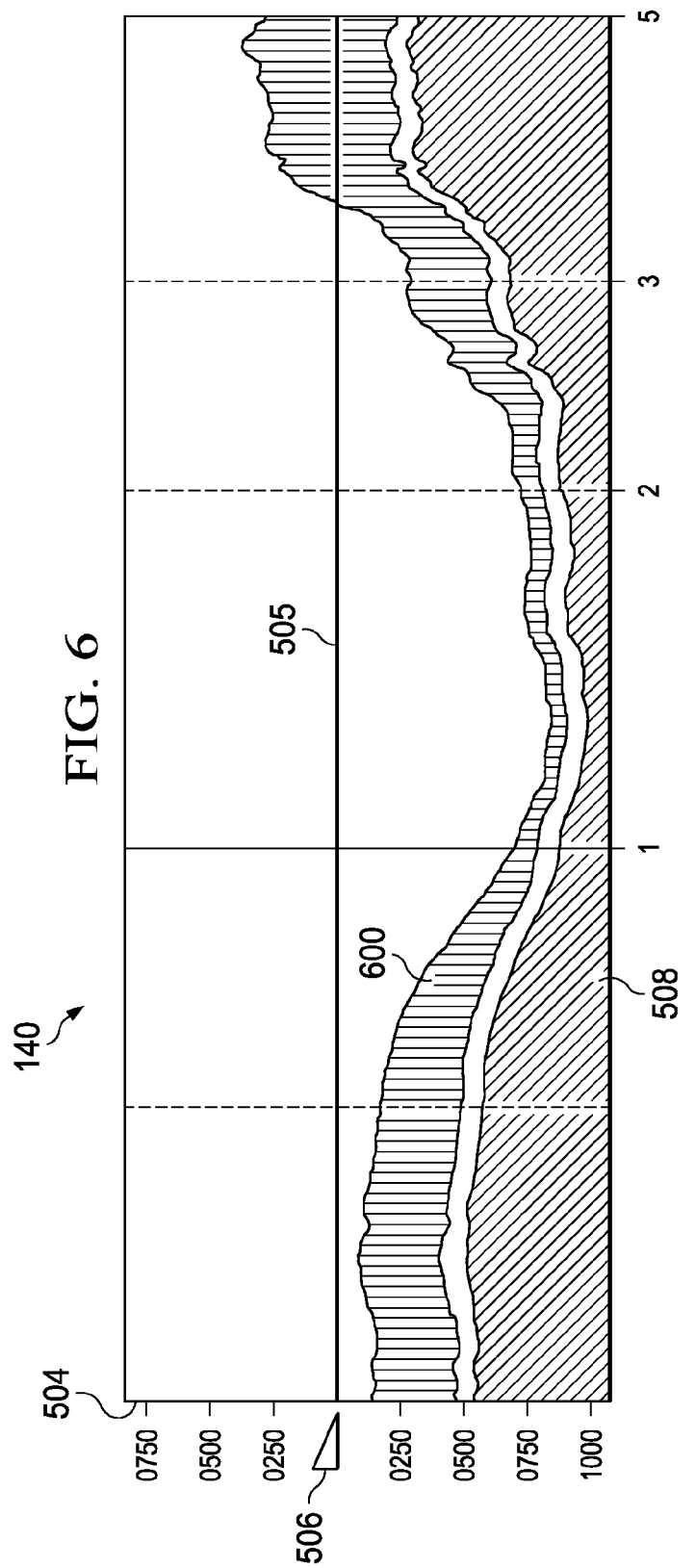
FIG. 6 is an illustration of a graphical user interface in accordance with an advantageous embodiment.

FIG. 6 illustrates an another advantageous embodiment of the graphical image displayed on the display device 140. The avoid area 600 displayed is the avoid area identified for the rotorcraft 104 based on the current altitude 141 and the current airspeed 135 of the rotorcraft 104 and the flight plan for the rotorcraft's 104 flight route.

This avoid area 600 has a varying thickness over the upcoming terrain based on the rotorcraft's 104 preplanned flight route. In other words, the avoid area 600 indicates a changing range of altitudes over the terrain 106 to be avoided during the flight 102. The range of altitudes may change over the upcoming terrain along the route 108 in response to a number of different factors. This avoid area 600 is different from the avoid area 510, which has a substantially uniform thickness over the upcoming terrain.

For example, in one embodiment, the height of the avoid area 600 varies with airspeed. If the airspeed is predicted (either through a flight plan or through an algorithm associating the rotorcraft 104 with climbs and dives), the avoid area 600 shown on the display will vary in height, whereby the avoid area 600 becomes thinner for higher predicted airspeeds and thicker for slower predicted airspeeds. Other factors that may influence the avoid area include, but are not limited to, planned airspeed for the rotorcraft's 104 flight 102, changes in gross weight due to fuel burn or payload pickup/dropoff, changes in density altitude, and/or other relevant factors.

Figure 7:
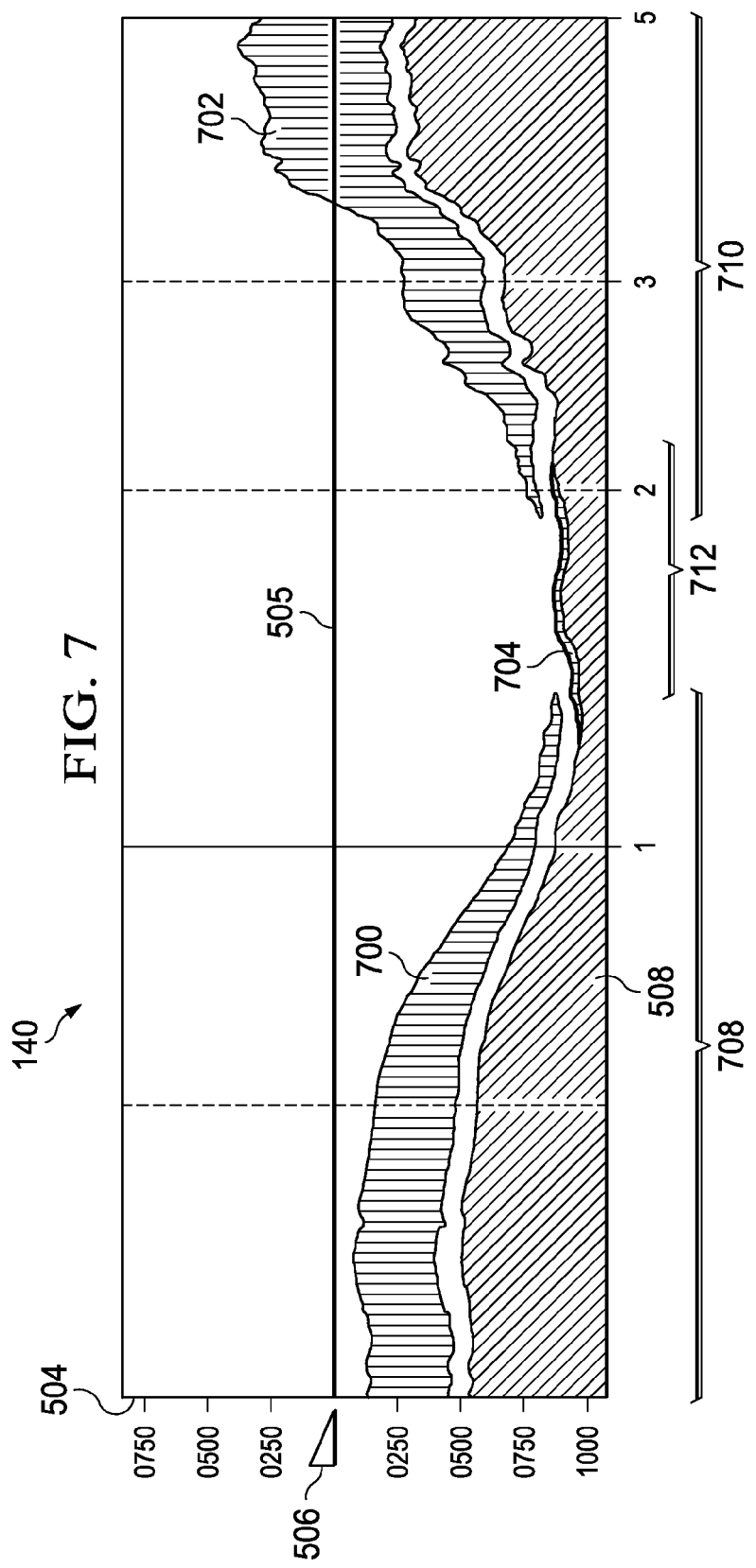
FIG. 7 is an illustration of a graphical user interface in accordance with an advantageous embodiment.

FIG. 7 illustrates yet another advantageous embodiment of the graphical image displayed on the display device 140. In this illustrative example, a first area 700, a second area 702, and a third area 704 are displayed on the display device 140. In this depicted example, the rotorcraft 104 is predicted to fly at airspeeds between about zero knots and about 50 knots along a portion 708 over the terrain area 508 and along a portion 710 over the terrain area 508. At these airspeeds, the ranges of altitudes 122 to be avoided by the rotorcraft 104 during the flight 102 are indicated by the first area 700 for the portion 708 and the second area 702 for the portion 710. In this illustrative example, the first area 700 and the second area 702 correspond to the range of altitudes to be avoided at airspeeds under about 50 knots, as depicted in the first height-velocity area 410 in FIG. 4.

Further, the rotorcraft 104 is predicted to fly at airspeeds above about 50 knots for a portion 712 over the terrain area 508. At these airspeeds, the range of altitudes to be avoided by the rotorcraft 104 during the flight 102 is indicated by third area 704. For these airspeeds, the third area 704 indicates a range of altitudes below about 20 feet above the terrain 106 indicated by the terrain area 508. A third area 704 corresponds to the range of altitudes to be avoided at airspeeds above about 50 knots, as depicted in second height-velocity area 416 in FIG. 4

Figure 8:
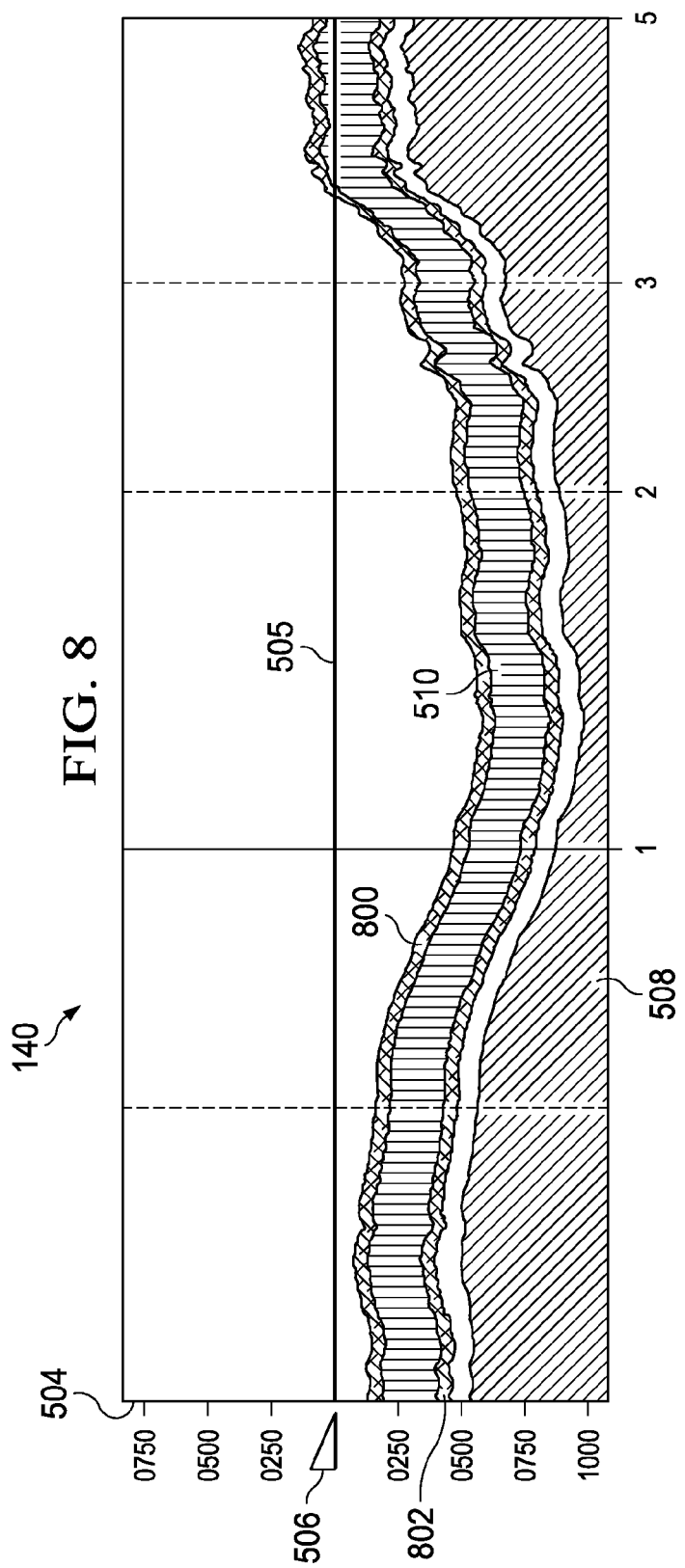
FIG. 8 is an illustration of a graphical user interface in accordance with an advantageous embodiment.

FIG. 8 illustrates yet another advantageous embodiment of the graphical image displayed on the display device 140. In addition to the avoid area 510, this embodiment also includes a caution area 800 and a caution area 802. These caution areas 800 and 802 are displayed for the rotorcraft 104 having two or more engines. The caution regions 143 include the altitudes at which the rotorcraft 104 can still make the desired landing 124 in response to a loss of one of the engines during the flight 102 over the terrain 106 indicated by the terrain area 508.

Figure 9:
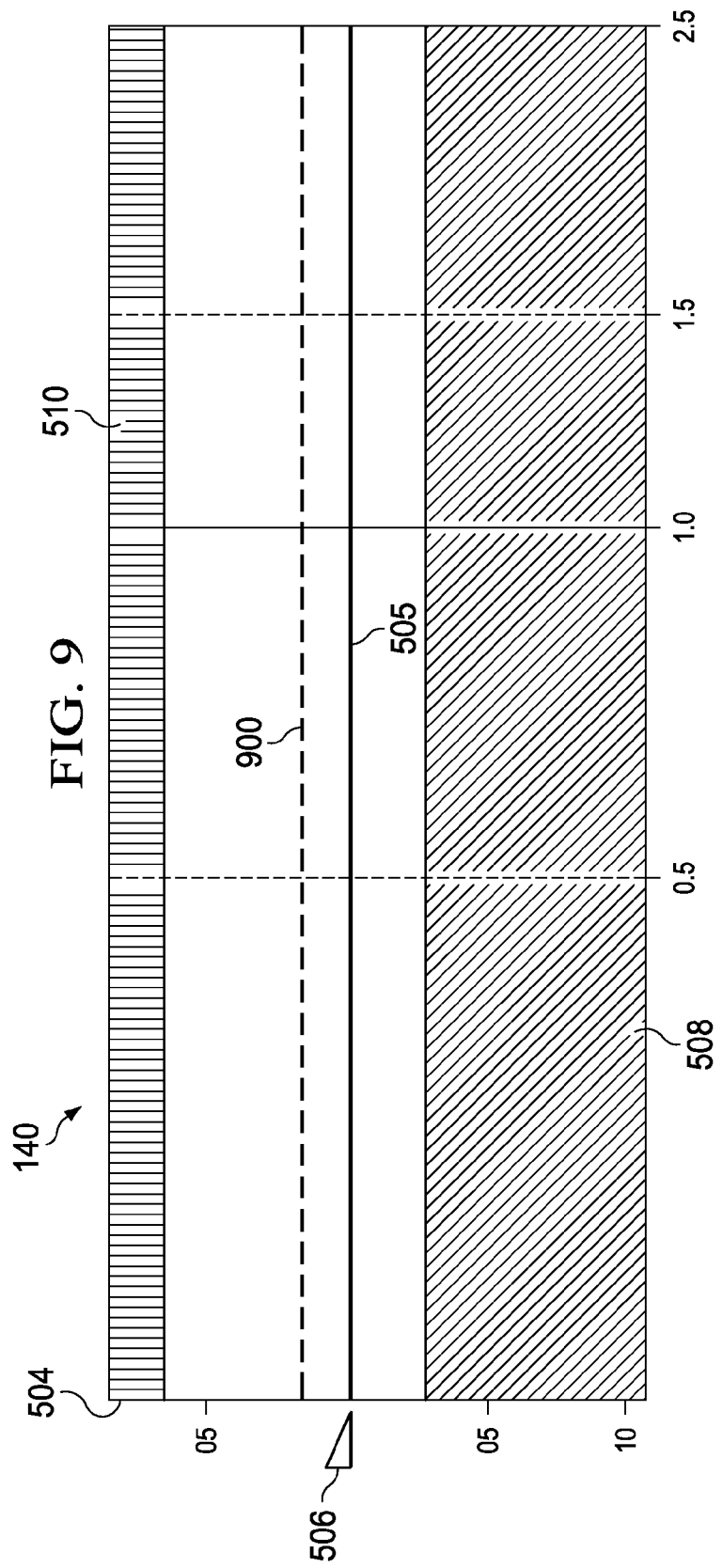
FIG. 9 is an illustration of a graphical image displayed on a display device in accordance with an advantageous embodiment.

FIG. 9 illustrates yet another advantageous embodiment of the graphical image displayed on the display device 140. In this illustrative example, a takeoff profile 900 that is recommended for the rotorcraft 104 at lower airspeeds is displayed on the graphical image displayed on display device 140 from FIG. 5. The takeoff profile 900 indicates the altitude recommended for takeoff for the current airspeed 135. Of course, in some illustrative example, the takeoff profile 900 may be recommended for the planned airspeed 216, the predicted airspeed 244, and/or the current airspeed 135 for the rotorcraft 104.

The position and display of the recommended takeoff profile 900 would change during the takeoff as the airspeed of the rotorcraft 104 changes. The rotorcraft 104 can fly over the terrain 106 indicated by the terrain area 508 but should avoid flying at altitudes indicated by the avoid area 510.

Figure 10:
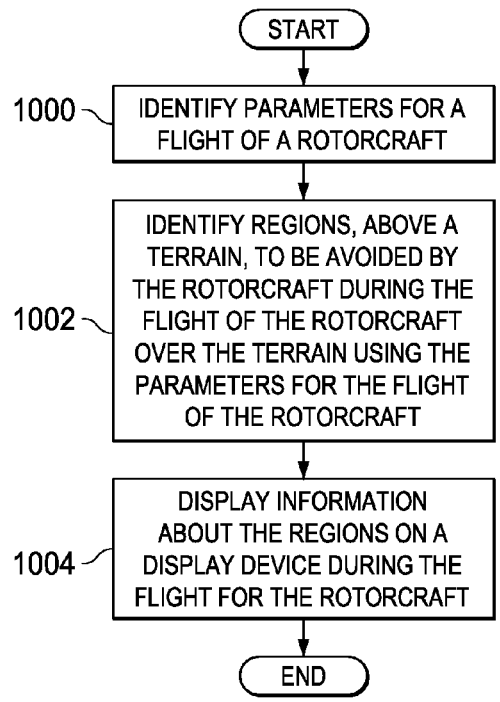
FIG. 10 is an illustration of a flowchart of a process for managing a flight of a rotorcraft in accordance with an advantageous embodiment.

With reference now to FIG. 10, an illustration of a flowchart of a process for managing the flight 102 of the rotorcraft 104 is depicted in accordance with an advantageous embodiment. The process illustrated in FIG. 10 may be implemented using the vertical situation awareness module 114 in FIG. 1.

The process begins by identifying the parameters 130 for the flight 102 of the rotorcraft 104 (operation 1000). The parameters 130 may include, for example, current parameters, planned parameters, predicted parameters, and/or other suitable parameters for the flight 102 of the rotorcraft 104. For example, the parameters 130 may include at least one of the current airspeed 135, planned airspeed, predicted airspeed, the current altitude 141, planned altitude, predicted altitude, gross weight of the rotorcraft 104, and environmental factors.

Thereafter, the process identifies the regions 120, above terrain 106, to be avoided by the rotorcraft 104 during the flight 102 of the rotorcraft 104 over the terrain 106 using the parameters 130 for the flight 102 of the rotorcraft 104 (operation 1002). The regions 120 indicate the ranges of altitudes 122 above the terrain 106 to be avoided during the flight 102 of the rotorcraft 104 for any given airspeed. In these examples, the rotorcraft 104 can make the desired landing 124 on the terrain 106 in response to the undesired event 126 occurring during the flight 102 when the rotorcraft 104 avoids flying within the regions 120.

The process then displays the information 136 about the regions 120 on the display device 140 during the flight 102 for the rotorcraft 104 (operation 1004), with the process terminating thereafter. In operation 1004, the process may display the areas 142 corresponding to the regions 120 on the vertical profile view 144 on the graphical user interface 138 displayed on the display device 140 in these illustrative examples.

Figure 11:
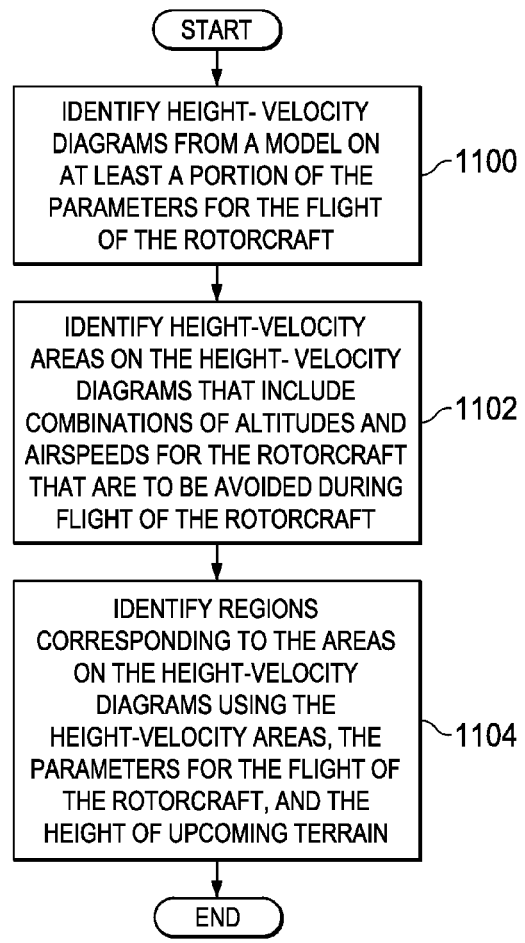
FIG. 11 is an illustration of a flowchart of a process for identifying a number of regions, above a terrain, to be avoided by a rotorcraft during flight of the rotorcraft over terrain in accordance with an advantageous embodiment.

With reference now to FIG. 11, an illustration of a process for identifying the regions 120, above the terrain 106, to be avoided by the rotorcraft 104 during the flight 102 of the rotorcraft 104 over the terrain 106 is depicted in accordance with an advantageous embodiment. The process illustrated in FIG. 11 is a more-detailed process of the operation 1002 in FIG. 10.

The process begins by identifying the height-velocity diagrams 134 from the model 132 on at least a portion of the parameters 130 for the flight 102 of the rotorcraft 104 (operation 1100). The model 132 is a model of the energy available for the rotorcraft 104 to enter into the autorotation 129. The model 132 identifies the conditions in which sufficient energy is not available for the rotorcraft 104 to fully enter the autorotation 129 before reaching the terrain 106. A subset of the information 136 included in the model 132 in FIG. 1 is presented in the height-velocity diagrams 134.

The height-velocity diagrams 134 are graphs of altitude above ground versus airspeed. Each height-velocity diagram may include the height-velocity curves 137 that bound and define the height-velocity areas 139. In this illustrative example, the height-velocity areas 139 may be based on altitude, airspeed, and gross weight for the rotorcraft 104.

Thereafter, the process identifies the height-velocity areas 139 on the height-velocity diagrams 134 that include combinations of altitudes and airspeeds for the rotorcraft 104 that are to be avoided during the flight 102 of the rotorcraft 104 (operation 1102).

Thereafter, the process identifies the regions 120 corresponding to the areas 142 on the height-velocity diagrams 134 using the height-velocity areas 139, the parameters 130 for the flight 102 of the rotorcraft 104, and the height of upcoming terrain (operation 1104), with the process terminating thereafter. The identification of the regions 120 may take into account parameters 130 that are not taken into account in the height-velocity diagrams 134. For example, the identification of the regions 120 may take into account density altitude, environmental factors, and/or other suitable parameters 130.

The regions 120 identified include the combinations of altitudes and airspeeds to be avoided during the flight 102 of the rotorcraft 104 such that the desired landing 124 using the autorotation 129 may be made in response to the undesired event 126 occurring during the flight 102 of the rotorcraft 104.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Also, other blocks may be added in addition to the illustrated blocks in a flowchart or block diagram.

Thus, the different advantageous embodiments provide a method and apparatus for managing the rotorcraft's 104 flight 102. In one advantageous embodiment, the parameters 130 for the flight 102 of the rotorcraft 104 are identified. The regions 120, above the terrain 106, to be avoided by the rotorcraft 104 during the flight 102 of the rotorcraft 104 over the terrain 106, are identified using the parameters 130 for the flight 102 of the rotorcraft 104. The information 136 about the regions 120 above the terrain 106 is displayed on the graphical user interface 138 during the flight 102 for the rotorcraft 104.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disc (CD)-read only memory (CD-ROM), compact disc-read/write (CD-R/W), and Digital Video Disc (DVD).

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a flight of a rotorcraft, the method comprising:
    displaying, on a display, a vertical profile view of a flight route of the rotorcraft during the flight of the rotorcraft;
    displaying, on the display, a height of the rotorcraft above terrain at a current position of the rotorcraft;
    displaying, on the display, a cross section of upcoming terrain relative to the flight route of the rotorcraft;
    calculating avoid areas for the upcoming terrain and the terrain at the current position;
    displaying, on the display, the avoid areas above the cross section of the upcoming terrain; and
    using autorotation in response to an undesired event occurring during the flight of the rotorcraft when the rotorcraft avoids the avoid areas.

2. The method of claim 1, wherein calculating is performed using parameters (130) for the flight (102) of the rotorcraft (104) and a model (132) that includes a number of height-velocity diagrams (134) for the rotorcraft (104).

3. The method of claim 2, wherein a height-velocity diagram (400) in the number of height-velocity diagrams (134) includes a number of height-velocity curves (137) that define a number of height-velocity areas (139) to be avoided by the rotorcraft (104) during the flight (102) of the rotorcraft (104) over the terrain (106).

4. The method of claim 2 wherein the parameters (130) for the flight (102) of the rotorcraft (104) include at least one of current airspeed (135), planned airspeed (216), predicted airspeed (224), current altitude (141), planned altitude (218), predicted altitude (226), current gross weight (212) of the rotorcraft (104), planned gross weight (220) of the rotorcraft (104), predicted gross weight (228) of the rotorcraft (104), current density altitude (214), planned density altitude (222), predicted density altitude (230), and environmental factors (232).

5. The method of claim 2 wherein the parameters (130) are selected from at least one of current parameters (202), planned parameters (204), and predicted parameters (206).

6. The method of claim 1, wherein the display further indicates a number of ranges of altitudes (122) to be avoided when flying at a particular airspeed.

7. The method of claim 1, wherein the rotorcraft (104) makes a desired landing (24) using the autorotation.

8. The method of claim 1, wherein heights of the avoid areas displayed on the display vary according to changes in the terrain.

9. The method of claim 8, wherein the heights of the avoid areas displayed on the display further vary according a change of airspeed of the rotorcraft.

10. The method of claim 1, wherein displaying the avoid areas further comprises:
displaying at least one of a minimum altitude (145) and a maximum altitude (146) above the terrain (106) on the display device (140) based on an airspeed of the rotorcraft (104), wherein the rotorcraft (104) makes a desired landing (124) in response to an undesired event (126) occurring during the flight (102) when the rotorcraft (104) substantially avoids altitudes below the minimum altitude (145) and above the maximum altitude (146) during the flight (102).

11. The method of claim 1 further comprising:
identifying a minimum airspeed (148) for the rotorcraft (104), wherein autorotation (129) of the rotorcraft (104) from an airspeed below the minimum airspeed (148) to a desired landing (124) on the terrain (106) is not possible; and
displaying the minimum airspeed (148) for the rotorcraft (104) on the display device (140).

12. The method of claim 1, wherein the rotorcraft (104) is selected from a group consisting of a helicopter, a tilt-rotor aircraft, an autogyro, a rotary wing unmanned aerial vehicle, a multi-engine rotorcraft, and a single-engine rotorcraft.

13. The method of claim 1 further comprising:
displaying a takeoff profile (900) recommended for the rotorcraft (104) on the display device (140).

14. An apparatus comprising:
a display device; and
a processor unit configured to display, on the display device, a vertical profile view of a flight route of the rotorcraft during a flight of the rotorcraft; display, on the display device, a height of the rotorcraft above terrain at a current position of the rotorcraft; display, on the display device, a cross section of upcoming terrain relative to the flight route of the rotorcraft; calculate avoid areas for the upcoming terrain and the terrain at the current position; display, on the display device, the avoid areas above the cross section of the upcoming terrain; and use autorotation in response to an undesired event occurring during the flight of the rotorcraft when the rotorcraft avoids the avoid areas.

15. The apparatus of claim 14, wherein the processor unit is further configured to calculate by using parameters (130) for the flight (102) of the rotorcraft (104) and a model (132) that includes a number of height-velocity diagrams (134) for the rotorcraft (104).

16. The apparatus of claim 15, wherein a height-velocity diagram (400) in the number of height-velocity diagrams (134) includes a number of height-velocity curves (137) that define a number of height-velocity areas (139) to be avoided by the rotorcraft (104) during the flight (102) of the rotorcraft (104) over the terrain (106).

17. The apparatus of claim 15 wherein the parameters (130) for the flight (102) of the rotorcraft (104) include at least one of current airspeed (135), planned airspeed (216), predicted airspeed (224), current altitude (141), planned altitude (218), predicted altitude (226), current gross weight (212) of the rotorcraft (104), planned gross weight (220) of the rotorcraft (104), predicted gross weight (228) of the rotorcraft (104), current density altitude (214), planned density altitude (222), predicted density altitude (230), and environmental factors (232).

18. The apparatus of claim 14, wherein the processor is further configured to cause the display to further indicate a number of ranges of altitudes (122) to be avoided when flying at a particular airspeed.

19. The apparatus of claim 14, wherein the processor is configured to cause the rotorcraft to prompt a desired landing using the autorotation.

20. The apparatus of claim 14, wherein the processor is configured to cause the heights of the avoid areas displayed on the display to vary according to changes in the terrain.

21. The apparatus of claim 20, wherein the processor is configured to cause the heights of the avoid areas displayed on the display further vary according a change of airspeed of the rotorcraft.

22. The apparatus of claim 20, wherein the processor unit is further configured to display on the display device at least one of a minimum altitude (145) and a maximum altitude (146) above the terrain (106) based on an airspeed of the rotorcraft (104), wherein the processor further prompts the rotorcraft (104) to make a desired landing (124) in response to an undesired event (126) occurring during the flight (102) when the rotorcraft (104) substantially avoids altitudes below the minimum altitude (145) and above the maximum altitude (146) during the flight (102).

23. The apparatus of claim 14, wherein the processor unit (304) is further configured to identify a minimum airspeed (148) for the rotorcraft (104), wherein autorotation (129) of the rotorcraft (104) from an airspeed below the minimum airspeed (148) to a desired landing (124) on the terrain (106) is not possible; and display the minimum airspeed (148) for the rotorcraft (104) on the display device (140).

24. The apparatus of claim 14, wherein the processor unit (304) is further configured to display a graphical user interface (138) on the display device (140).

25. The apparatus of claim 14, wherein the rotorcraft (104) is selected from a group consisting of a helicopter, a tilt-rotor aircraft, an autogyro, a rotary wing unmanned aerial vehicle, a multi-engine rotorcraft, and a single-engine rotorcraft.

* * * * *